United States Patent [19]
Abdel-Hehim et al.

[11] Patent Number: 4,469,504
[45] Date of Patent: Sep. 4, 1984

[54] PROCESS FOR THE PARTIAL SOLUBILIZATION OF PHOSPHATE ROCK AND OBTAINING ACID AND PHOSPHATE FERTILIZERS THEREFROM

[75] Inventors: Hosam A. A. Abdel-Hehim; Wagner C. Coelho; Gloria M. G. Soares, all of Rio de Janeiro, Brazil

[73] Assignee: Petroleo Brasileiro S.A. - Petrobras, Rio de Janeiro, Brazil

[21] Appl. No.: 411,134

[22] Filed: Aug. 24, 1982

[30] Foreign Application Priority Data

Aug. 24, 1981 [BR] Brazil ................................. 8105391

[51] Int. Cl.³ ....................... C05B 11/04; C05B 1/00; C05B 11/00; C01B 25/16
[52] U.S. Cl. .......................................... 71/37; 71/40; 71/43; 71/53; 423/166; 423/313; 423/319; 423/320; 423/545

[58] Field of Search ............... 423/319, 320, 166, 545, 423/313; 71/37, 40, 43, 53

[56] References Cited

U.S. PATENT DOCUMENTS

| 1,936,316 | 11/1933 | Wadsted | 423/319 |
| 2,036,494 | 4/1936 | Plummer | 71/40 |
| 3,552,919 | 1/1971 | Roberts | 423/320 |
| 3,635,669 | 1/1972 | Rubin | 423/319 |

Primary Examiner—Gregory A. Heller
Attorney, Agent, or Firm—Sughrue, Mion, Zinn, Macpeak and Seas

[57] ABSTRACT

A rapid, low temperature process for solubilizing phosphate rocks having high content of foreign matter or a low phosphorus content to obtain: (a) a slow release fertilizer of the NP type; (b) phosphoric acid of high concentration plus MAP; and (c) DAP.

3 Claims, No Drawings

PROCESS FOR THE PARTIAL SOLUBILIZATION OF PHOSPHATE ROCK AND OBTAINING ACID AND PHOSPHATE FERTILIZERS THEREFROM

BACKGROUND OF THE INVENTION

This invention relates to a process for the solubilization of phosphate rock or phosphate containing materials, more precisely to a process for the solubilization of phosphate containing substances which until now had been difficult to accomplish by conventional methods because of foreign matter present.

DESCRIPTION OF THE PRIOR ART

Solubilizing concentrated phosphatic rock with sulphuric acid to get calcium sulphate and calcium phosphate is already known. However, such solubilization is hindered when the raw materials used have a high content of foreign matter, such as ferric oxide, alumina, calcium fluoride and silica, due to the formation of colloidal solutions that are difficult to filter out. Furthermore, after time in storage the end product tends to suffer from what is known as "retrogradation" that is, the foreign matter which was not entirely eliminated upon treatment reacts with the mono calcium phosphate present to form phosphorated compounds of iron and aluminum that are insoluble in water, thereby diminishing the available phorphorus content that might be assimilated by the soil. This loss is much more serious in soils of high iron and aluminum content.

SUMMARY OF THE INVENTION

One object of this invention is to provide a new process for the solubilization of phosphate rock, such as apatites and phosphorites. More particularly, this invention provides a short time (½-3 hours) relatively low temperature—(50°-130° C.) solubilization process for phosphate rock which contains high proportions of foreign matter or of low phosphorus content rock, i.e., containing 10% to 25% $P_2O_5$, the rest being foreign matter, to provide:
  (a) a slow release NP fertilizer (nitrogen-phosphorus);
  (b) highly concentrated phosphoric acid and MAP (monoammonium phosphate); and
  (c) DAP (diammonium phosphate).

DESCRIPTION OF PREFERRED EMBODIMENTS

The process of the present invention also has the advantage of there being no problems with the formation of colloidal solutions or of insoluble phosphorus compounds precipitating during storage as happens with known processes. The efficiency of phosphate fertilization is known to be much affected when soils are acid. In soils where the pH is less than 5.5, much phosphorus is lost since a high rate of acidity helps to wash out aluminum and iron compounds which lead to the appearance of insoluble phosphorus compounds within soil solutions. Therefore, for such soils, fertilizers of low water-solubility and slow citric-soluble phosphate (i.e., dissolving slowly in citric acid) fertilizers are recommended.

The process according to the present invention provides a slow release fertilizer which needs no after treatment, such as purifying, filtering, etc., which can be used directly as a fertilizer for acid soils of high aluminum and iron content, the NP rate of which lies in between 8-24 and 10-22 (which, of course, depends on the amount of solid acid ammonium sulphate initially used) KCl may be added thereto, if desired, after the initial attack, so as to thus arrive at the desired NPK rate.

The $P_2O_5$ content of the fertilizer of the present invention is gradually released in the soil since 20% of it is water-soluble, 40% is soluble in a neutral citrate solution and the remainder in the state of octacalcium phosphate (OCP)—is slowly released in acid soils. Hence, when first applied, the nutrient NP substances are released in the ratio 1:2, while residual phosphorus is released over a period of time.

In the initial stage of release the growth of soil bacteria, which help in the assimilation of phosphorus by plants, paves the way for the later stages of OCP assimilation.

The lack of F-ions and/or the presence of $Mg^{2+}$ ions prevents the OCP from becoming insoluble to hydroxiapatite or fluorapatite.

The nitrate compounds held in the mixture are of the slow release kind. The double salt $5CaSO_4(NH_4)_2 \cdot H_2O$ when in contact with water is broken down into $CaSO_4 \cdot 2H_2O$ and $(NH_2)SO_4$ at a rate which depends on the temperature and on the flow of water.

In order to secure the slow release NP type fertilizer of this invention, phosphate rock is reacted with solid acid ammonium sulphate, at an amount, by weight, of 0.4 to 0.7 parts of such ammonium salt to one part of phosphatic rock at a temperature in the range of 50° to 130° C. in the presence of sufficient water to ensure a moisture content of at least 16% (and maximum 100%).

The product of this reaction is an easily handleable powdery fertilizer that has an extremely low fluourine content, its composition being principally more than 50% of DAP (diammonium phosphate) and octacalcium phosphate $Ca_8H_2(PO_4)_6 \times H_2O$. During reaction more than 95% of the fluorine content is given off as HF and/or $SiF_4$ vapor.

Another embodiment of this invention relates to a process for obtaining highly concentrated phosphoric acid and/or an NP fertilizer which is completely soluble in water without any fine crystals of calcium sulphate being formed, this being one of the chief drawbacks of prior art to water-type systems. Per this embodiment, the calcium sulphate is precipitated as crystals that are easily filtered out. The process of this embodiment involves solubilizing the phosphate rock with acid ammonium sulphate in an amount by weight of 0.4 to 0.7 parts of solid acid ammonium sulphate to one part of phosphatic rock in the presence of water in an amount by weight in the range of 0.5 to 4 parts of water to one part of phosphatic rock at a temperature of from 50° to 110° C. for a reaction time of 10–180 minutes; followed by the addition of concentrated sulphuric acid in an amount by weight of 0.15 to 0.50 parts of concentrated 96% to 100% sulphuric acid to one part of phosphatic rock; the temperature in this latter step being held at 30+ to 80° C. for a period of no longer than one hour and minimum five minutes.

To the product obtained, which is a mixture of $CaSO_4$ MAP and $H_3PO_4$, preheated to 50°-70° C. ethyl alcohol is added in an amount by weight of 2 to 6 parts of alcohol to one part of phosphatic rock, the MAP and $H_3PO_4$ being easily solubilized while calcium sulphate and other foreign material are precipitated as crystals that are easily filtered out.

If desired, the resulting alcohol solution containing phosphoric acid and MAP may be distilled to obtain highly concentrated phosphoric acid and MAP. It is preferred to treat such an alcohol solution with ammonia ($NH_3$) at a temperature of 25° to 60° C. to provide a fertilizer which may be easily dissolved in water and which is mainly made up of DAP (more than 50%) and a smaller proportion of ammonium sulphate (less than 49%), the amount of the latter depending on the quantity of excess acid ammonium sulphate employed in the reaction. It is possible to work with until 49% of excess.

Some examples of the invention are next given which describe, but do not limit it.

EXAMPLE I 15 g of concentrate from Araxa, the composition of which was: $Fe_2O_3$-3.76%, CaO-56.46%, SrO-0.58%, $TiO_2$-1.12%, BaO-0.2%, $P_2O_5$-36.4%, $SiO_2$-0.35%, $Al_2O_3$-0.97%, $CO_2$-1.17%, MgO-0.14%, $Na_2O$-0.27%, F-1.94%, $P_2O_5$, soluble in neutral citrate, 0.71% and $P_2O_5$ soluble in citric acid-3.6%, were mixed with 7.8 g of $NH_4HSO_4$ and 20 ml of $H_2O$. The temperature was then raised to 100° C. and, after reacting for ½ hour, the ground product had the following composition: F-0.05%, $P_2O_5$-total 22.2%, $P_2O_5$ soluble in $H_2O$-5.3%, $P_2O_5$ soluble in neutral citrate-8.8%, N-4.2%.

EXAMPLE II 15 g of VALEP concentrate, the composition of which was: $Fe_2O_3$-3.67%, CaO-49.94%, SrO-0.51%, $TiO_2$-1.89%, $K_2O$-0.20%, $P_2O_5$-34.95%, $SiO_2$-1.93%, $Al_2O_3$-1.37%, $CO_2$-0.84%, MgO-0.23%, $Na_2O$-0.09%, F-1.33%, $P_2O_5$ soluble in neutral citrate-0.57%, $P_2O_5$-soluble in citric acid-4.7%, were mixed with 7.5 g of $NH_4HSO_4$ and 20 ml of $H_2O$. The temperature was then raised to 100° C. and, after ½ an hour of reacting, the ground powdery product had the following composition: F-0.04%, $P_2O_5$ (total)-21.3%, $P_2O_5$ soluble in water-5.3%, $P_2O_5$ soluble in neutral citrate-8.13%, N-4.3%.

EXAMPLE III 13 g of rock concentrate from Patos de Minas, the composition of which was: $Fe_2O_3$-3.19%, CaO-31.9%, SrO-0.22%, $TiO_2$-0.31%, BaO-0.01%, $P_2O_5$-26%, $SiO_2$-10.2%, $Al_2O_3$-6.8%, $CO_2$-0.86%, MgO-0.04%, $Na_2O$-0.06% and F-1.81%, were mixed with 7 mg of $NH_4HSO_4$ and 20 ml of water. Temperature of mass being reacted was raised to 80° C. and after 150 minutes 4 g of concentrated $H_2SO_4$ were added. After 30 minutes 80 ml of commercial ethyl alcohol (95%) were added to the mass being reacted. The suspension thus obtained was then filtered and the resulting precipitate was over-dried for 1 hour, after which it weighed 17.0 g and its $P_2O_5$ content, non-soluble in neutral ammonium citrate, was 0.60%. The alcohol filtrate was neutralized with anhydrous ammonia where upon a precipitate was derived; the weight of which was 7.28 g, containing 41.76% of $P_2O_5$ and 20.43% of N.

EXAMPLE IV 13 g of concentrate from Patos de Minas, the composition of which was the same as that in Example III, were mixed with 6 g of $NH_4HSO_4$ and 20 ml of $H_2O$. The temperature was then raised to 80° C. and, after 150 minutes, 4 g of concentrated $H_2SO_4$ was added to the mass under reaction. Thirty minues after adding the $H_2SO_4$ the reacted mass was treated with 80 ml of commercial ethyl alcohol (95%), the suspension filtered and after being left 1 hour at 80° C. in the over, its precipitate weighed 17.2 g and contained 0.7 g of $P_2O_5$, insoluble in ammonium citrate. The alcohol filtrate, after being neutralized with anyhydrous ammonia, yielded a precipitate which was found to weight 6.74 and to contain 44.53% of $P_2O_5$ and 20.41% of N.

While the invention has been described in detail and with reference to specific embodiments thereof, it will be apparent to one skilled in the art that various changes and modifications can be made therein without departing from the spirit and scope thereof.

What is claimed is:

1. A process for the partial solubilization of phosphate rock to obtain (1) phosphoric acid and (2) fertilizer comprising: mono ammonium phosphate, therefrom comprising:
   (a) reacting phosphate rock with acid ammonium sulfate in an amount by weight of 0.4 to 0.7 parts of said acid ammonium sulfate to 1 part of phosphate rock in the presence of 0.5 to 4 parts of water to 1 part of phosphate rock at a temperature of 50° to 110° C. for 30 minutes;
   (b) adding concentrated sulfuric acid in an amount of 0.15 to 0.5 parts of concentrated sulfuric acid to 1 part phosphate rock to the mixture of step (a);
   (c) maintaining a temperature of 30° to 80° C. and adding ethyl alcohol to the mixture of step (b) in an amount by weight of 2 to 6 parts of ethyl alcohol to 1 part phosphate rock; and
   (d) precipiting calcium sulfate crystals from the solution in step (c) and filtering out said crystals to obtain (1) phosphoric acid and (2) fertilizer comprising: mono ammonium phosphate.

2. A process for the partial solubilization of phosphate rock to obtain (1) phosphoric acid and (2) fertilizer comprising: mono ammonium phosphate, comprising:
   (a) reacting phosphate rock with acid ammonium sulfate in an amount by weight of 0.4 to 0.7 parts of said acid ammonium sulfate to 1 part of phosphate rock in the presence of 0.5 to 4 parts of water to 1 part of phosphate rock at a temperature of 50° to 110° C. for 30 minutes;
   (b) adding concentrated sulfuric acid in an amount of 0.15 to 0.5 parts of concentrated sulfuric acid to 1 part phosphate rock to the mixture of step (a);
   (c) maintaining a temperature of 30° to 80° C. and adding ethyl alcohol to the mixture of step (b) in an amount by weight of 2 to 6 parts of ethyl alcohol to 1 part phosphate rock; and
   (d) distilling the alcohol from step (c) to obtain (1) phosphoric acid and (2) fertilizer comprising: mono ammonium phosphate.

3. A process for the partial solubilization of phosphate rock to obtain fertilizer comprising: diamonnium phosphate and ammonium sulfate, therefrom comprising:
   (a) reacting phosphate rock with acid ammonium sulfate in an amount by weight of 0.4 to 0.7 parts of said acid ammonium sulfate to 1 part of phosphate rock in the presence of 0.5 to 4 parts of water to 1 part of phosphate rock at a temperature of 50° to 110° C. for 30 minutes;
   (b) adding concentrated sulfuric acid in an amount of 0.15 to 0.5 parts of concentrated sulfuric acid to 1 part phosphate rock to the mixture of step (a);

(c) maintaining a temperature of 30° to 80° C. and adding ethyl alcohol to the mixture of step (b) in an amount by weight of 2 to 6 parts of ethyl alcohol to 1 part phosphate rock;

(d) precipitating calcium sulfate crystals from the solution in step (c) and filtering out said crystals; and (e) contacting the solution of step (d) with $NH_3$ at a temperature of between 25° to 60° C. to obtain fertilizer comprising: diammonium phosphate and ammonium sulfate.

* * * * *